(12) United States Patent
Kim et al.

(10) Patent No.: US 10,600,244 B2
(45) Date of Patent: Mar. 24, 2020

(54) VERTEX OPTIMIZATION METHOD USING DEPTH IMAGE IN WORKSPACE MODELING AND SYSTEM THEREFOR

(71) Applicant: Korea University of Technology and Education Industry-University Cooperation Foundation, Cheonan-si (KR)

(72) Inventors: Sang-Youn Kim, Seoul (KR); Hyun Keun Park, Seoul (KR); Sang Man Seong, Cheonan-si (KR); In-Hee Song, Cheonan-si (KR); Sun-Young Shin, Cheonan-si (KR); Deug Yong An, Cheonan-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 14 days.

(21) Appl. No.: 16/185,750

(22) Filed: Nov. 9, 2018

(65) Prior Publication Data

US 2019/0197776 A1 Jun. 27, 2019

(30) Foreign Application Priority Data

Dec. 22, 2017 (KR) .................. 10-2017-0178890

(51) Int. Cl.
*G06T 17/20* (2006.01)

(52) U.S. Cl.
CPC ........ *G06T 17/205* (2013.01); *G06T 2200/08* (2013.01)

(58) Field of Classification Search
None
See application file for complete search history.

(56) References Cited

U.S. PATENT DOCUMENTS

2017/0316602 A1* 11/2017 Smirnov .................. G06T 5/50

FOREIGN PATENT DOCUMENTS

KR        1020170020210 A      2/2017

* cited by examiner

*Primary Examiner* — Vu Nguyen
(74) *Attorney, Agent, or Firm* — STIP Law Group, LLC

(57) ABSTRACT

The present invention relates a vertex optimization method and system using a depth image in workspace modeling, the method including generating a workspace model by scanning a workspace and modeling the workspace; generating a vertex image by projecting vertices in the workspace model generated in the scanning of the workspace; generating a depth image by expanding the vertices in the vertex image generated in the generating of the vertex image; and resampling the workspace model generated in the generating of the workspace model using the depth image generated in the generating of the depth image. Accordingly, the depth image can be generated from a vertex image obtained by projecting spatial data scanned through a 3D scanner onto a virtual wall, thereby uniformly aligning non-uniform vertices and filling gaps in which no vertices are generated.

6 Claims, 8 Drawing Sheets

1. Generating workspace model
2. Vertex image
3. Depth image
4. Resampling model (a)  (b)

(the number of vertices = 126K)     (the number of vertices = 17K)

Resampled workspace model
(the number of vertices = 17K)

VERTEX OPTIMIZATION METHOD USING DEPTH IMAGE IN WORKSPACE MODELING AND SYSTEM THEREFOR

CROSS REFERENCE TO RELATED APPLICATION

The present application claims priority to Korean Patent Application No. 10-2017-0178890, filed Dec. 22, 2017, the entire contents of which is incorporated herein for all purposes by this reference.

BACKGROUND OF THE INVENTION

Field of the Invention

The present invention relates to a vertex optimization method and a system therefor and, more particularly, to a vertex optimization method using a depth image in workspace modeling and a system therefor.

Description of the Related Art

Generally, localization refers to a task of finding the position of an object, that is, a position measurement, when a map is given, and mapping refers to a task of making the map when the position of an object is known.

FIG. 1 is a view illustrating a result of workspace modeling using a 3D scanner. Upon using the 3D scanner, it is possible to sense the surrounding environment and map the space, thereby modeling the workspace in 3D. On the other hand, in 3D modeling, a vertex means a point as a basic unit. In this case, three or more vertices are gathered to form one polygon, and these polygons are combined such that an object may be represented as a 3D graphic.

However, this modeling method has a problem that too many vertices can be generated. For example, the total number of vertices used in the workspace modeling shown in FIG. 1 measures up to 790K. When too many vertices are generated, the amount of computation for vertex processing increases dramatically in the workspace modeling. Accordingly, enormous hardware resources are required, whereby there is a problem that an increase in the cost of graphics processing is caused.

In addition, there is a problem that when a large number of vertices are generated in the workspace modeling, the generated vertices are not uniform and thus there is a lot of gaps where the vertices are partially not generated or missing.

As the related art, Korean Patent Application Publication No. 10-2017-0020210 entitled "Method and apparatus for constructing a three-dimensional model of an object" has been proposed.

SUMMARY OF THE INVENTION

Accordingly, the present invention has been made keeping in mind the above problems occurring in the prior art, and an object of the present invention is to provide vertex optimization method and system using a depth image in workspace modeling, in which the depth image is generated from a vertex image obtained by projecting spatial data scanned through a 3D scanner onto a virtual wall, thereby uniformly aligning non-uniform vertices and filling gaps in which no vertices are generated.

In addition, it is another object of the present invention to provide vertex optimization method and system using a depth image in workspace modeling, whereby it is possible to dramatically reduce the number of vertices required in workspace modeling, reduce the amount of computation for processing vertices, and reduce the cost of graphics processing, by performing resampling on the workspace from a depth image to model the workspace.

In order to achieve the above-mentioned objects, a vertex optimization method for a vertex generated in workspace modeling using a 3D scanner according to the present invention includes generating a workspace model by scanning a workspace and modeling the workspace; generating a vertex image by projecting vertices in the workspace model generated in the scanning of the workspace; generating a depth image by expanding the vertices in the vertex image generated in the generating of the vertex image; and resampling the workspace model generated in the generating of the workspace model using the depth image generated in the generating of the depth image.

Preferably, the generating the vertex image may include projecting the vertices in the workspace model generated in the generating of the workspace model onto a virtual plane.

More preferably, a brightness of the vertex image may be set depending on a distance of the virtual plane to the vertex.

More preferably, the darker the vertex image, the closer the distance of the virtual plane to the vertex, and the brighter the vertex image, the farther the distance of the virtual plane to the vertex.

More preferably, the generating the depth image may expand the vertices using a dilate function.

In order to achieve the above-mentioned objects, a vertex optimization system using a depth image in workspace modeling uses the system using the vertex optimization method using the depth image in the workspace modeling.

According to vertex optimization method and system using a depth image in workspace modeling, the depth image can be generated from a vertex image obtained by projecting spatial data scanned through a 3D scanner onto a virtual wall, thereby uniformly aligning non-uniform vertices and filling gaps in which no vertices are generated.

In addition, according to vertex optimization method and system using a depth image in workspace modeling, it is possible to dramatically reduce the number of vertices required in workspace modeling, reduce the amount of computation for processing vertices, and reduce the cost of graphics processing, by performing resampling on the workspace from a depth image to model the workspace.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
FIG. 1 is a view illustrating a result of workspace modeling using a 3D scanner.

Hereinafter, preferred embodiments of the present invention will be described in detail with reference to the accompanying drawings so that those skilled in the art can easily carry out the present invention. In the following detailed description of the preferred embodiments of the present invention, a detailed description of known functions and configurations incorporated herein will be omitted when it may make the subject matter of the present invention rather unclear. The same reference numerals are used for portions having similar functions and configurations throughout the drawings.

In addition, throughout the specification, when a part is referred to as being "connected" to other part, it includes not only the case that the part is "directly connected" to the other part, but also the case that the part is "indirectly connected" to the other part with another device in between. In addition, "comprising any component" means that other components may be further included, rather than excluding other components, unless specifically stated otherwise.

Each step of the vertex optimization method using the depth image in workspace modeling according to an embodiment of the present invention may be performed by a computing device. Hereinafter, for convenience of explanation, the execution subject at each step may be omitted.

Figure 2:
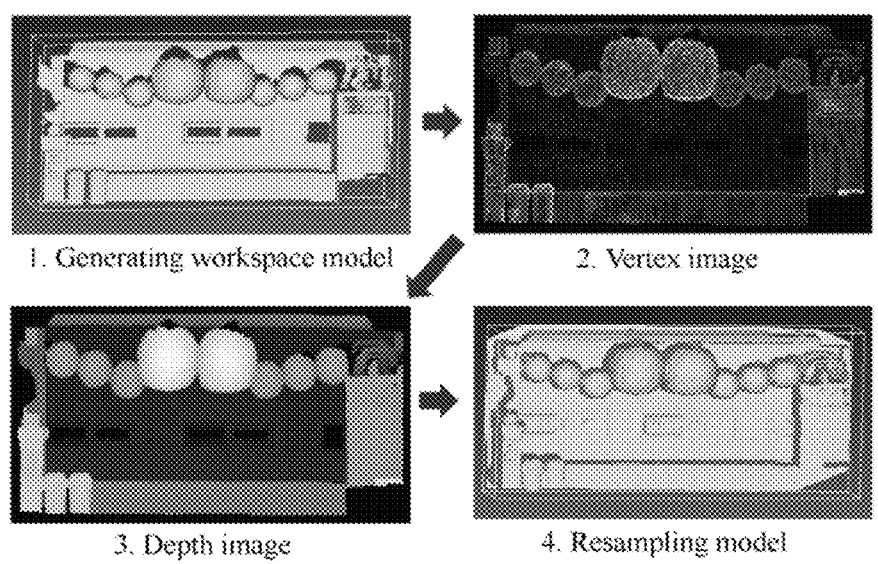
FIG. 2 is a view illustrating overall process of a vertex optimization method using a depth image in workspace modeling according to an embodiment of the present invention.

FIG. 2 is a view illustrating overall process of a vertex optimization method using a depth image in workspace modeling according to an embodiment of the present invention. As shown in FIG. 2, the vertex optimization method using the depth image in the workspace modeling according to an embodiment of the present invention may scan the workspace using a 3D scanner and model the workspace. Herein, the data scanned using the 3D scanner may be aligned along X, Y, and Z axes. Then, a vertex image may be generated by projecting the modeled workspace model onto a virtual plane. Thereafter, a depth image may be generated by expanding the vertex using the generated vertex image. Finally, it is possible to perform resampling on the workspace model using the generated depth image. Therefore, the vertex optimization method using the depth image in the workspace modeling according to an embodiment of the present invention may generate the vertex image and the depth image, thereby perform resampling on the workspace model. In addition, it is possible to significantly reduce the number of vertices required in the workspace modeling via the resampling. Further, it is possible to uniformly align vertices and fill gaps in which no vertices are generated.

Figure 3:
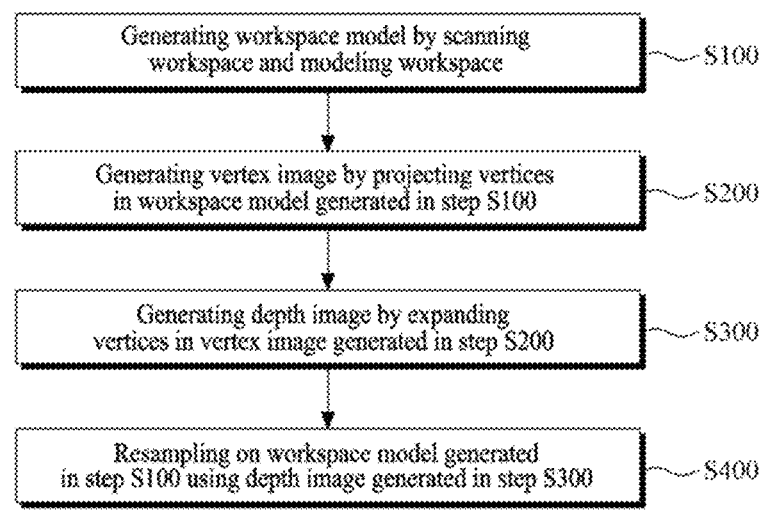
FIG. 3 is a block diagram illustrating a vertex optimization method using a depth image in workspace modeling according to an embodiment of the present invention.

FIG. 3 is a block diagram illustrating a vertex optimization method using a depth image in workspace modeling according to an embodiment of the present invention. As shown in FIG. 3, a vertex optimization method using a depth image in workspace modeling according to an embodiment of the present invention is a vertex optimization method for a vertex generated in workspace modeling using a 3D scanner, and includes steps of generating a workspace model by scanning a workspace and modeling the workspace (S100), generating a vertex image by projecting vertices in the workspace model generated in step S100 (S200), generating a depth image by expanding vertices in the vertex image generated in step S200 (S300), and performing resampling on the workspace model generated in step S100 using the depth image generated in step S300 (S400). Hereinafter, the vertex optimization method using the depth image in the workspace modeling will be described in detail.

Figure 4:
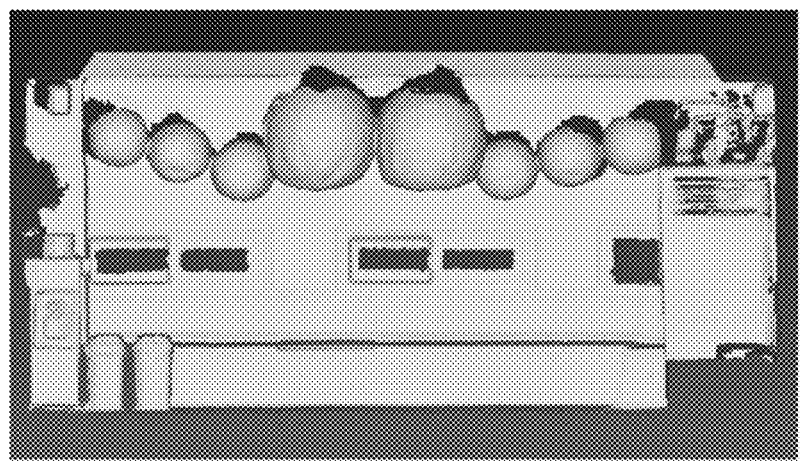
FIG. 4 is a view illustrating a workspace model generated in step S100 of a vertex optimization method using a depth image in workspace modeling according to an embodiment of the present invention.

FIG. 4 is a view illustrating a workspace model generated in step S100 of a vertex optimization method using a depth image in workspace modeling according to an embodiment of the present invention. As shown in FIG. 4, in step S100, a workspace model may be generated by scanning the workspace and modeling the workspace. That is, in step S100, the workspace may be scanned using a 3D scanner, and then the workspace may be modeled. Herein, the modeled workspace model may be expressed as a 3D graphic. Therefore, the workspace model generated in step S100 may have a vertex.

On the other hand, in step S100, the work space may be modeled using the virtual walls. More specifically, in step S100, only the frame of the work space may be scanned first using the 3D scanner thereby generating spatial data. And then, in step S100, the virtual walls may be generated around the frame in the generated spatial data. Thereafter, the wall of the workspace corresponding to each of the virtual walls may be scanned thereby generating wall data. Herein, the spatial data may be aligned along X, Y, and Z axes. More specifically, after generating projection data by projecting spatial data onto the virtual wall orthogonal to each of the X, Y, and Z axes, respectively, an outline is extracted for each projection data, and the outline is aligned along each of the X, Y, and Z axes. Herein, aligning the outlines along the X, Y, and Z axes may mean aligning the rectangle formed by the outlines in such a manner as to be matched with the virtual walls. Accordingly, the virtual wall may be generated in such a manner as to be parallel to each wall of the workspace. In step S100, after aligning the spatial data along X, Y, and Z axes, the walls of the workspace corresponding to the respective virtual walls are scanned respectively so that even objects on the walls of the workspace may be scanned in detail. Therefore, in step S100, as shown in FIG. 4, the workspace model may be generated along the X, Y, and Z axes.

Figure 5:
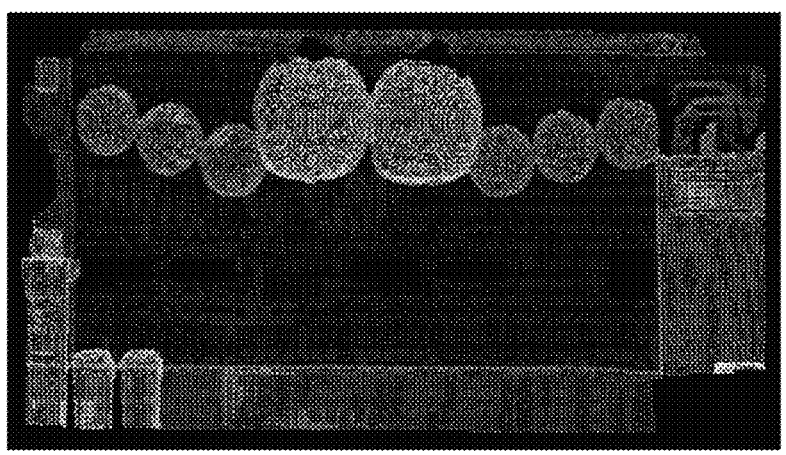
FIG. 5 is a view illustrating a vertex image generated in step S200 of a vertex optimization method using a depth image in workspace modeling according to an embodiment of the present invention.

FIG. 5 is a view illustrating a vertex image generated in step S200 of a vertex optimization method using a depth image in workspace modeling according to an embodiment of the present invention. As shown in FIG. 5, a vertex image may be generated by aligning vertices of the workspace model generated in step S100, in step S200. Herein, in step S200, the vertices of the workspace model generated in step S100 may be projected onto the virtual plane. That is, the vertex image may be an image obtained by projecting the vertices of the workspace model onto the virtual plane.

In step S200, an arbitrary virtual plane may be generated and the workspace model may be projected onto the virtual plane, thereby generating the vertex image. Herein, the brightness of the vertex image may be set according to the distance of the vertex to virtual plane. That is, the brightness of the vertex image may be set according to the distance of the vertex to the plane. The darker the vertex image, the closer the distance of the vertex to the virtual plane. Also, the brighter the vertex image, the farther the distance of the vertex to the virtual plane. The vertex image shown in FIG. 5 is an image obtained by generating a virtual plane on the front wall in reference to FIG. 4 and projecting a workspace model onto the corresponding virtual plane. Therefore, referring to FIGS. 4 and 5, it may be seen that the brightness of the vertex located on the wall close to the virtual plane is low. Also, it may be seen that the brightness of the vertex located in a sphere farthest from the virtual plane is high.

Figure 6:
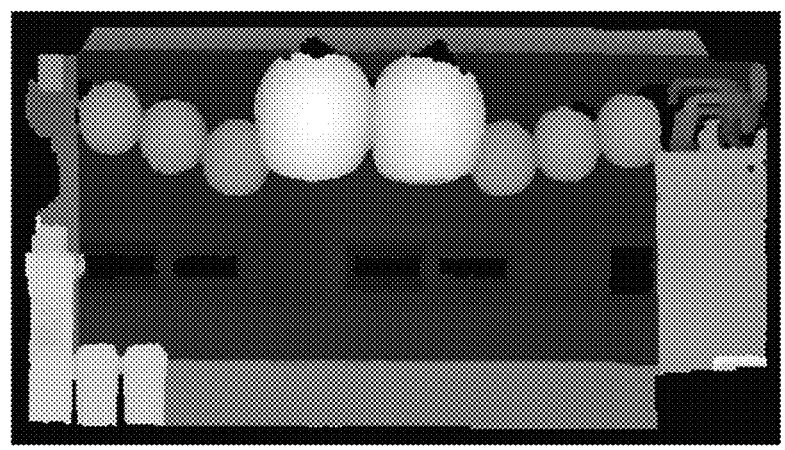
FIG. 6 is a view illustrating a depth image generated in step S300 of a vertex optimization method using a depth image in workspace modeling according to an embodiment of the present invention.

FIG. 6 is a view illustrating a depth image generated in step S300 of a vertex optimization method using a depth image in workspace modeling according to an embodiment of the present invention. As shown in FIG. 6, in step S300, a depth image may be generated by expanding the vertices in the vertex image generated in step S200. Herein, the vertex image generated in step S200 may have different brightness values depending on the distance of each vertex to the virtual plane. When expanding the vertices in the vertex image, each vertex may be expanded while maintaining the brightness value thereof. Therefore, as shown in FIG. 6, the expanded vertices may overlap each other to generate the depth image. Since the depth image is an image generated by expanding the vertices in the vertex image, the depth image may also have a different brightness depending on the distance from the virtual plane. Therefore, referring to FIGS. 4 and 6, it may be seen that the brightness of the portion located on the wall close to the virtual plane is low. In addition, it may be seen that the brightness of the portion located on the sphere that is farthest from the virtual plane is high. That is, the depth image may have depth information according to the brightness value.

Herein, in step S300, the vertices may be expanded by using a dilate function. The dilate function is an expansion function that may expand each vertex. The extent to which the vertex is expanded may be variously set according to the embodiments.

Figure 7:
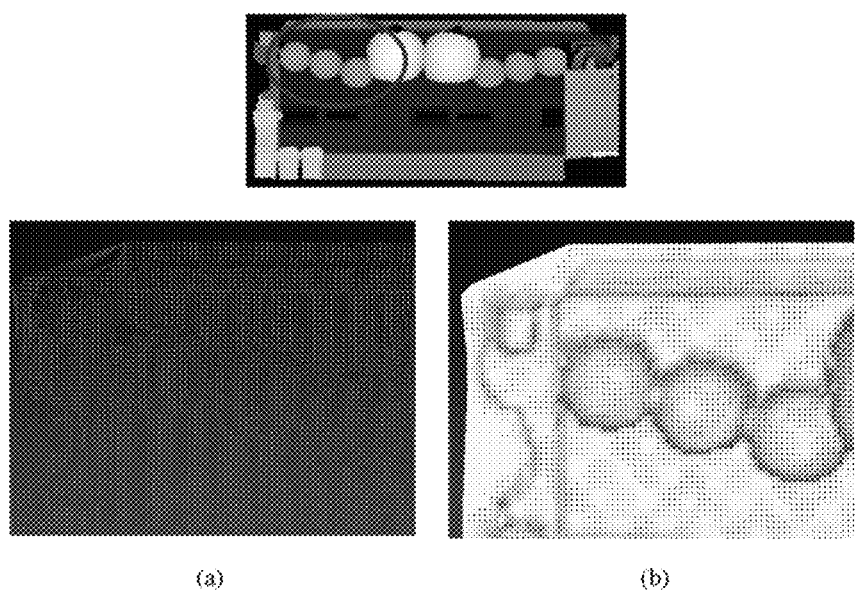
FIG. 7 is a view illustrating a state of performing resampling on a workspace model in step S400 of a vertex optimization method using a depth image in workspace modeling according to an embodiment of the present invention.

FIG. 7 is a view illustrating a state of performing resampling on a workspace model in step S400 of a vertex optimization method using a depth image in workspace modeling according to an embodiment of the present invention. As shown in FIG. 7, in step S400, the workspace model generated in step S100 may be resampled using the depth image generated in step S300. As described above, the depth image may have depth information depending on the brightness value. Accordingly, in step S400, it is possible to perform resampling on the workspace model generated in step S100 using the depth information of the depth image.

Referring to FIG. 7, in step S400, the workspace model generated in step S100 may be resampled to align non-uniform vertices and significantly reduce the number of vertices. In FIG. 7, a lower left side (a) is an enlarged view of the depth image generated in step S300, and a lower right side (b) is an image showing a vertex of the workspace model resampled in step S400. As shown in the lower right side (b) in FIG. 7, it may be seen that the vertices of the resampled workspace model in step S400 are uniformly aligned. Accordingly, in step S400, the workspace model may be resampled using the depth image to uniformly align non-uniform vertices and fill gaps in which no vertices have been generated.

Figure 8:
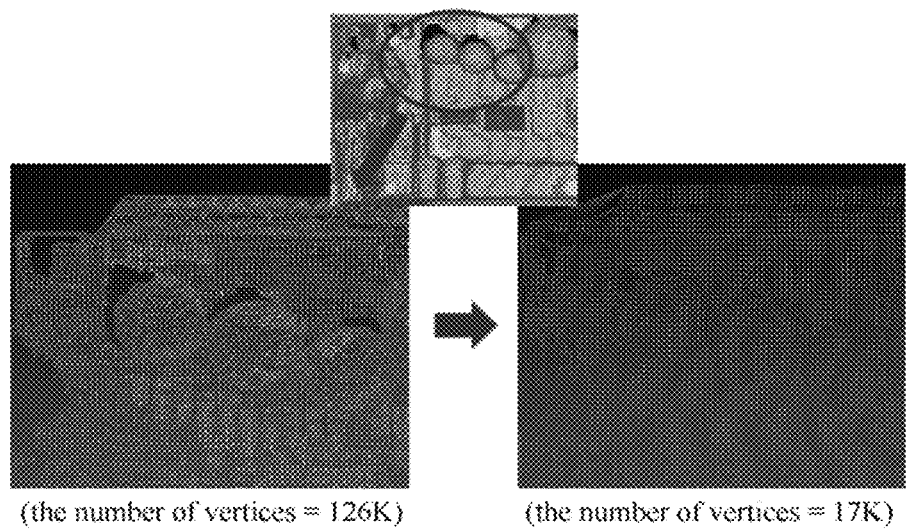
FIG. 8 is an enlarged view of vertices of a workspace model in steps S100 and S400 of a vertex optimization method using a depth image in workspace modeling according to an exemplary embodiment of the present invention.

FIG. 8 is an enlarged view of vertices of a workspace model in steps S100 and S400 of a vertex optimization method using a depth image in workspace modeling according to an embodiment of the present invention. As shown in FIG. 8, the number of vertices for a part of the workspace model generated in step S100 measures up to a total of 126K. However, it may be seen that the number of vertices of the resampled workspace model is just only 17K in step S400. That is, in the example shown in FIG. 8, it is possible to model the workspace model using only about 13% of the existing vertices through the vertex optimization method using the depth image in the workspace modeling according to an embodiment of the present invention.

Figure 9:
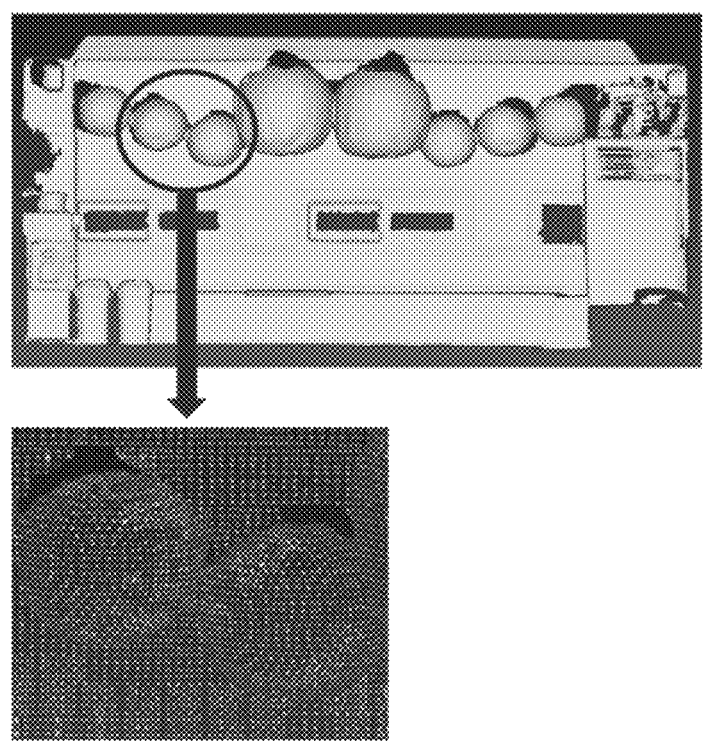
FIG. 9 is an enlarged view of vertices of a workspace model generated in step S100 of a vertex optimization method using a depth image in workspace modeling according to an embodiment of the present invention.
Figure 10:
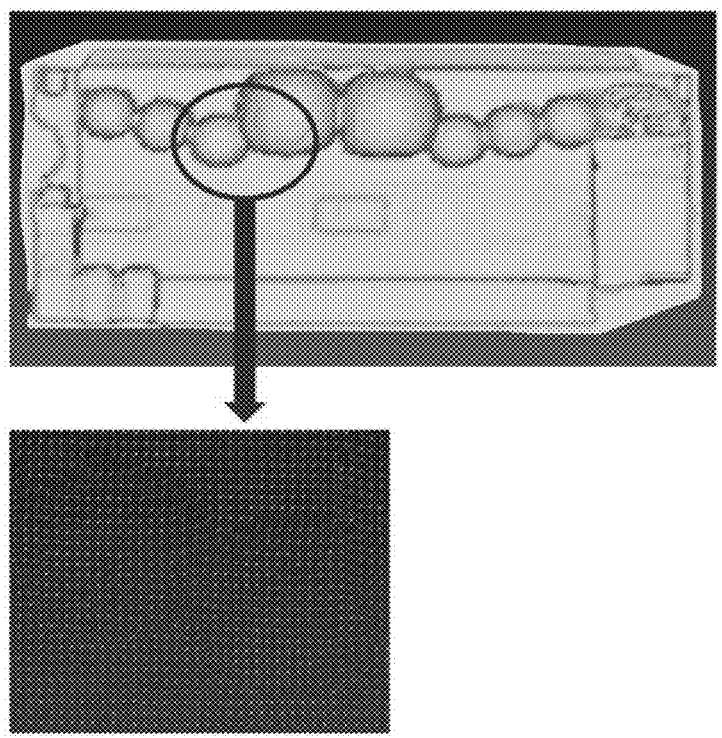
FIG. 10 is an enlarged view of vertices of a workspace model obtained by performing resampling in step S400 of a vertex optimization method using a depth image in workspace modeling according to an exemplary embodiment of the present invention.

FIG. 9 is an enlarged view of vertices of a workspace model generated in step S100 of a vertex optimization method using a depth image in workspace modeling according to an embodiment of the present invention. In addition, FIG. 10 is an enlarged view of vertices of a workspace model resampled in step S400 of a vertex optimization method using a depth image in workspace modeling according to an exemplary embodiment of the present invention. As described above, the vertex optimization method using the depth image in the workspace modeling according to an embodiment of the present invention may minimize the number of vertices required in the workspace modeling. In addition, comparing FIG. 9 to FIG. 10, it may be seen that the vertices of the workspace generated in step S100 are non-uniformly arranged, and there is also a gap in which no vertex is generated. However, it may be seen that the vertices of the resampled workspace model are arranged relatively uniformly in step S400, and it may be seen that the vertices are also generated in the gaps where the vertex is not generated in FIG. 9.

Meanwhile, a vertex optimization system using a depth image in workspace modeling according to another embodiment of the present invention may be a system that uses the vertex optimization method using the depth image in the workspace modeling according to an embodiment of the present invention. That is, the vertex optimization system using the depth image in the workspace modeling according to another embodiment of the present invention may be also implemented as a system in which an application or a program including an instruction for the vertex optimization method using the depth image in the workspace modeling is executed.

As described above, according to a vertex optimization method and system using a depth image in workspace modeling, the depth image can be generated from a vertex image obtained by projecting spatial data scanned through a 3D scanner onto a virtual wall, thereby uniformly aligning non-uniform vertices and filling gaps in which no vertices are generated. In addition, according to a vertex optimization method and system using a depth image in workspace modeling, it is possible to dramatically reduce the number of vertices required in workspace modeling, reduce the amount of computation for processing vertices, and reduce the cost of graphics processing, by performing resampling on the workspace from a depth image to model the workspace.

It will be understood by those skilled in the art that various changes and modifications may be made without departing from the spirit and scope of the present invention as defined by the following claims.

What is claimed is:

1. A vertex optimization method for a vertex generated in workspace modeling using a 3D scanner, the method comprising:
generating a workspace model by scanning a workspace and modeling the workspace;
generating a vertex image by projecting vertices in the workspace model generated in the scanning of the workspace;
generating a depth image by expanding the vertices in the vertex image generated in the generating of the vertex image; and
resampling the workspace model generated in the generating of the workspace model using the depth image generated in the generating of the depth image.

2. The method of claim 1, wherein the generating the vertex image includes projecting the vertices in the workspace model generated in the generating of the workspace model onto a virtual plane.

3. The method of claim 2, wherein a brightness of the vertex image is set depending on a distance of the virtual plane to the vertex.

4. The method of claim 3, wherein the darker the vertex image, the closer the distance of the virtual plane to the vertex, and the brighter the vertex image, the farther the distance of the virtual plane to the vertex.

5. The method of claim 1, wherein the generating the depth image expands the vertices using a dilate function.

6. A vertex optimization system using a depth image in workspace modeling, the system using the vertex optimization method using the depth image in the workspace modeling according to claim 1.

* * * * *